April 13, 1926.

P. A. NEWMAN

ELECTRIC MOTOR AND CONTROL SYSTEM THEREFOR

Filed June 30, 1921

1,580,848

Inventor:
Paul A. Newman,
by Hubert A. Pattison,
Atty.

Patented Apr. 13, 1926.

1,580,848

UNITED STATES PATENT OFFICE.

PAUL A. NEWMAN, OF WOODHAVEN, NEW YORK, ASSIGNOR TO WESTERN ELECTRIC COMPANY, INCORPORATED, OF NEW YORK, N. Y., A CORPORATION OF NEW YORK.

ELECTRIC MOTOR AND CONTROL SYSTEM THEREFOR.

Application filed June 30, 1921. Serial No. 481,730.

*To all whom it may concern:*

Be it known that I, PAUL A. NEWMAN, a citizen of the United States of America, residing at Woodhaven, in the county of Queens, State of New York, have invented certain new and useful Improvements in Electric Motors and Control Systems Therefor, of which the following is a full, clear, concise, and exact description.

This invention relates to electric motors, and has particular reference to electric motors which are designed to drive loads continuously and without interruption.

An object of the invention is to so design an electric motor that it may be shifted during full operation from one source of current to another without decreasing its speed or mechanical output.

Another object of the invention is to so connect such a specially designed motor in circuits supplied with currents of different characteristics that the motor may be switched from one source of current to the other without decreasing its speed or mechanical output.

In the embodiment illustrated in the drawings, the motor is so designed that it may be actuated by either of two sources of direct current each of different voltage. It is to be understood, however, that the construction of the motor may be such that the two current supplies therefor may have a variety of different characteristics i. e., both being alternating currents of different phase or frequency or one source being alternating current and the other source direct current etc., without departing from the spirit and scope of the invention.

More specifically the embodiment of the invention disclosed herein comprises two armatures mounted on a single shaft, a field winding associated with each, a different source of direct current of different voltage serving to energize each field winding and its associated armature and means whereby said fields may be alternately energized.

Other features of the invention not specifically mentioned above will more clearly appear from the following specification and the accompanying drawings, in which.

Figure 1:
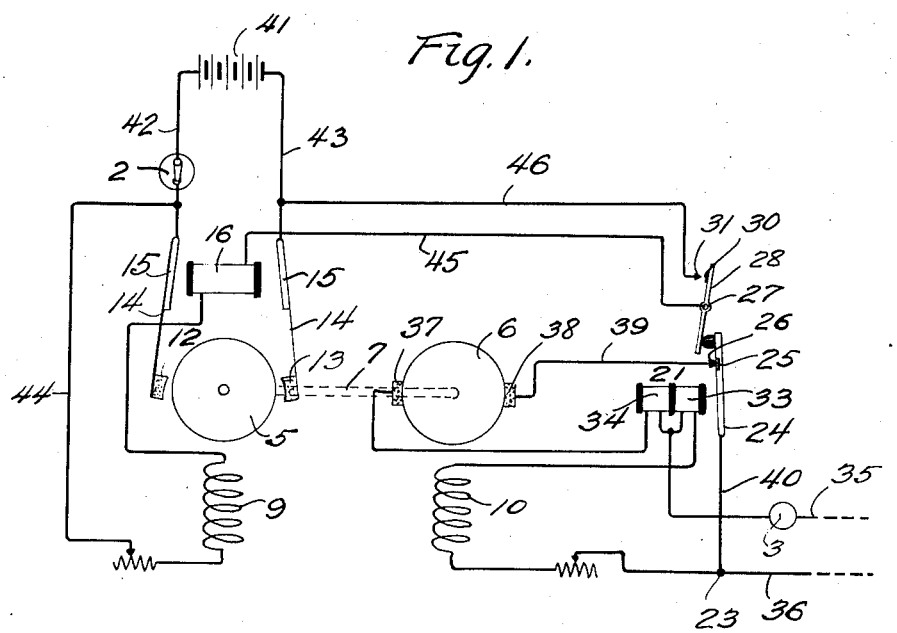
Fig. 1 is a schematic illustration of the circuit connections whereby the motor shown in Fig. 2 may be automatically and instantaneously shifted from one current supply to another.

Referring now to the drawings in detail, in which like reference numerals designate similar parts throughout the several views, the reference numerals 5 and 6 represent two direct current armatures mounted upon a common shaft 7. Armature 5 is shown in end elevation in Fig. 2 which also shows a casing 8 which supports bearings for the shaft 7 and also encloses the armatures 5 and 6 and shunt field windings 9 and 10 shown schematically in Fig. 1, field winding 9 being associated with armature 5 and field winding 10 with armature 6.

The field windings 9 and 10 and their associated armatures are electrically independent and constitute two separate motors mounted upon a common shaft and housed by a unitary casing.

The windings of armature 5 are connected to a commutator 11 mounted upon the shaft 7, cooperating with which are brushes 12 and 13 mounted upon the lower ends of arms 14 which are secured to armatures 15 arranged adjacent opposite ends of the core of a relay 16 secured to a ring shaped plate 17 fastened within the casing 8. The relay 16 is secured in a horizontal position and above the commutator. The armatures 15 are pivoted to the framework of the relay at points 18 which are insulated from each other as shown, and when no current is flowing through the coil of the relay are held in the position shown in which the brushes 12 and 13 are retained out of contact with the commutator 11 by means of springs connected at one end to the arms 14 and at their other ends to studs 20 secured to the plate 17.

A second relay 21 is secured to the plate 17 in a horizontal position and below the commutator 11. Cooperating with the pole piece of the relay 21 is an armature 22 pivoted to a stud 23 supported by the plate 17. Secured to the armature 22 is an arm 24 carrying midway between its ends a contact 25 which, when the relay 21 is energized, is held in engagement with a second contact 26 carried by a stud secured to the plate 17. Pivoted at its center to a stud 27 secured to the plate 17 is an arm 28, the lower end of which is held in engagement with a pin 29, of insulating material secured to the arm 24, by means of a torsion spring 4. When the relay 21 is energized, the arms 24 and 28 occupy the positions shown in which a contact 30 carried by the upper end of arm 28 is out of engagement with a contact 31 secured to the adjacent stud 20.

A source of direct current of relatively low voltage, which serves as a reserve current source, as will be hereinafter described in detail, is connected to the studs 20 which are electrically connected by leads 32 with the arms 14 carrying the brushes 12 and 13. When the relay 16 is energized, as will be hereinafter explained, the brushes 12 and 13 are brought in contact with the commutator 11 connecting the windings of armature 5 directly across the current source connected to the studs 20 and at the same time energizing the field winding 9 which is connected in shunt of the armature 5. The field winding 10 is adapted to be supplied with a direct current of relatively high voltage which is the normal current source, as will be hereinafter described in detail. The relay 21 has two windings 33 and 34 shown schematically in Fig. 1, the former being in series with the field winding 10, and the latter in series with the armature winding 6. As long as current is supplied to the field 10 and armature 6, both windings of relay 21 will be energized. These windings are accumulative and as a consequence the armature 22 of the relay will be held in its attracted position, as shown in Fig. 2, separating contacts 30 and 31 and closing contacts 25 and 26. However, upon failure of this current source, relay 21 will be deenergized in a manner hereinafter described in detail, permitting the spring 4 to rotate the arm 28 counter clockwise closing contacts 30 and 31 and separating contacts 25 and 26. The closure of the former contacts electrically connects studs 27 and 20 and since the circuit for relay 16, as will be hereinafter described, passes through them, the relay is energized causing the brushes 12 and 13 to be brought in contact with the commutator 11, as previously described.

Figure 2:
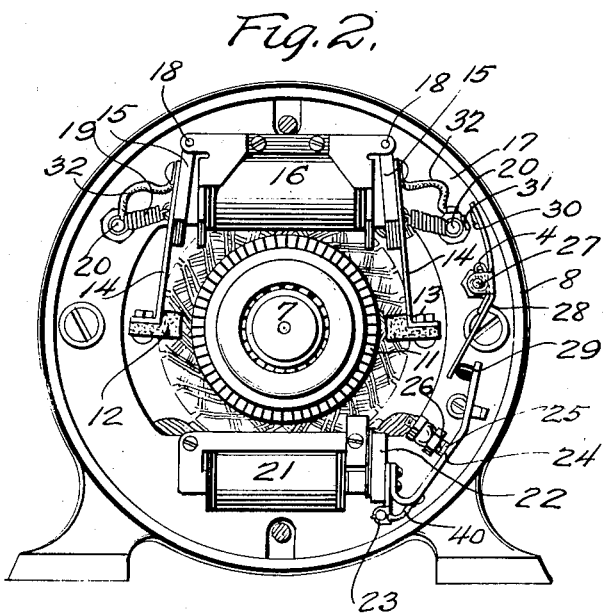
Fig. 2 is an end elevation of a motor constructed in accordance with the invention, the adjacent end plate being removed, to show the means for shifting from one current supply to the other.

The functions of the relays 16 and 21, which control the operation of the two motors, can best be understood from the circuit diagram shown in Fig. 1. The reference numerals 35 and 36 designate the leads of a direct current source of relatively high voltage which normally supplies current for operating the motor, and may, therefore, be designated as the "normal supply". One terminal of the field winding 10 is connected to the main 36 while the other terminal of the said field is connected in series with the winding 33 of relay 21 which is in series with the other main 35 through a switch 3 of any suitable type. Cooperating with the commutator to the segments of which the armature windings 6 are connected, are brushes 37 and 38, brush 37 being connected in series with the winding 34 of relay 21 which winding is also in series with the main 35, brush 38 being connected by conductor 39 with contact 26. Arm 24 which carries contact 25 is electrically connected by conductor 40 to the stud 23 upon which the said armature is pivoted, the said stud being electrically connected with the current main 36. A source of direct current of relatively low voltage, which is illustrated as being a battery 41, has its opposite poles connected to the armatures 15 of relay 16 by conductors 42 and 43, a suitable form of switch 2 being connected in series with the conductor 42. The battery 41 is only used when the normal supply of current connected to the mains 35 and 36 fails, and as a consequence, the said battery may be termed a "reserve current source". One terminal of the field winding 9 is connected to the conductor 42 by conductor 44 while the other terminal of said field winding is in series with the winding of relay 16 which is electrically connected by conductor 45 with the stud 27 to which the arm 28 is pivoted. Contact 31, which cooperates with contact 30, secured to the arm 28, is electrically connected with the conductor 43 by means of conductor 46.

In initially starting the motor, the switch 2 is open, and the switch 3 closed, which latter establishes an energizing circuit for the field winding 10, which may be traced from supply main 36, field winding 10, winding 33 of relay 21, switch 3 to main 35. Since the energizing circuit for the field 10 also includes in series, winding 33 of the relay 21, this winding is energized which produces flux sufficient to attract armature 22 which, at the beginning of its movement, rotates lever 28 clockwise a distance sufficient to separate contacts 30 and 31 and then during its further travel closes contacts 25 and 26. The closure of contacts 25 and 26 completes an energizing circuit for armature 6 which may be traced from main 36, stud 23, conductor 40, arm 24, contacts 25, 26, conductor 39, brushes 38, 37, winding 34 of relay 21, switch 3 to main 35. The shaft 7 is now being driven by the armature 6, and the armature 5 connected to the said shaft serving merely as a fly wheel, the latter armature having its circuit broken, due to the fact that brushes 12 and 13 are out of contact with commutator 11, and the field winding 9 associated therewith being deenergized, due to the fact that its energizing circuit is open both at switch 2 and contacts 30 and 31. After the armature 6 has been set in motion, as previously described, the switch 2 may be closed, which, however, does not cause an energization of field winding 9, since contacts 30 and 31 are separated.

The shaft 7 is actuated by armature 6 as long as the switch 3 is closed, and current is supplied the mains 35 and 36. If, for any reason, however, the current impressed upon said mains should fail, the field winding 10 and armature 6, together with the windings 33 and 34 of the relay 21 will be deprived of current, so that the said relay will release its armature 22 permitting the levers 24 and 28 to be moved under the influence of torsion spring 4 to separate contacts 25 and 26, breaking the armature circuit and closing contacts 30 and 31. If the armature 6 is driving a light load, after the current source connected to mains 35 and 36 fails, the momentum of the said armature 6 and armature 5, serving as a fly wheel, will cause the armature 6 to rotate for an appreciable length of time and function as a generator exciting the shunt field winding 10 and also energizing coils 33 and 34 of relay 21. If the said relay were provided merely with one coil in series with either field 10 or the armature 6, and other motors or other resistance loads were connected in parallel to mains 35 and 36, when the current source connected to mains 35 and 36 failed, the armature 6, functioning as a generator, in the manner just described, would excite the said winding causing it to retain its armature 22 in an attracted position until the speed of the armatures 5 and 6 had slowed down to a point where the current supplied by armature 6 was so low that it would not energize the coil of the relay sufficient to hold its armature attracted and the said armature would finally release. In such a case, however, the shaft 7 would materially decrease in its speed and mechanical output before the relay 21 had released its armature to energize the armature 5 to drive the load connected to the shaft 7. In order to insure that relay 21 will instantaneously release armature 22 upon the failure of the current source connected to mains 35 and 36, the said relay is provided with the two windings 33 and 34 which function accumulatively while current is being supplied the armature 6 and field 10 from the current source connected to mains 35 and 36. When this current-source fails and the armature 6 functions as a generator, although the direction of current flowing in the coil 33 will remain the same, being in series with the shunt field 10, the current flowing in the coil 34 which is in series with the armature 6 will reverse. As a consequence, the flux produced by the coils 33 and 34 will be opposed, resulting in a quick deenergization of the core of the relay and causing it to quickly release armature 22.

As previously described, relay 21 in releasing its armature first breaks the circuit for armature 6 and then closes contacts 31 and 30. The closing of these contacts completes an energizing circuit for relay 16 which may be traced from one side of the storage battery 41, conductor 42, switch 2, conductor 44, field winding 9, winding of relay 16, conductor 45, stud 27, arm 28, contacts 30 and 31, conductors 46 and 43 back to the other side of the battery 41. Relay 16 in energizing attracts its armatures 15, moving the brushes 12 and 13 into engagement with commutator 11, closing the circuit of the armature 5, which may be traced from one side of the battery 41, conductor 42, switch 2, relay armature 15, arm 14, brush 12, the winding of armature 5, brush 13, arm 14, armature 15, conductor 43, back to the other side of battery 41. Due to the fact that the field winding 9 is in series with the relay 16, the said field winding is energized in advance of the closing of the armature circuit.

When current is again supplied mains 35 and 36, coil 33 of relay 21 will be energized causing it to attract its armature 22 which through the medium of arm 28, separates contacts 30 and 31, opening the field circuit 9 and at the same time deenergizing relay 16 permitting the springs 19 to move brushes 12 and 13 out of engagement with commutator 11, interrupting the armature circuit of armature 5. As previously described, after separating contacts 30 and 31, the further movement of armature 22 closes contacts 25 and 26 completing the circuit for armature 6.

From the above it will be understood that when the current source connected to mains 35 and 36 fails and the armature 6 ceases to drive the shaft 7, the armature 5 will be instantaneously brought into service to drive the said shaft, the simultaneous transition from one armature to the other causing no reduction in the speed or power delivered to the shaft 7. In the circuit shown, after the machine is started, the shaft 7 is actuated by the armature 6, driven by the current source connected to mains 35 and 36 which, as previously described, is the "normal supply," the said shaft being driven by the armature 5 only upon failure of the normal supply so that the battery 41 only serves as a "reserve supply." While the shaft 7 is being driven by armature 6, brushes 12 and 13 are out of engagement with commutator 11, reducing the frictional load on the shaft and at the same time preventing the armature 5 from generating any electromotive force which might tend to reduce the power output of armature 6. It will be appreciated that in addition to the advantage of having brushes 12 and 13 out of contact with the commutator 11 during the time the shaft 7 is being actuated by armature 6, the brushes 12 and 13 have the additional function of serving as a switch for making and breaking the circuit through the armature 5. Furthermore due to the fact that when the shaft 7 is being driven by the armature 5, the armature circuit 6 is broken by the separation of contacts 25 and 26 the said armature 6 is prevented from generating any electromotive force which might tend to reduce the power output of armature 5.

Attention is called to the fact that when a source of current is connected to mains 35 and 36, field 10 of armature 6 is energized in advance of closing the armature circuit, and, in like manner, the field circuit 9, associated with armature 5, is energized in advance of closing the said armature circuit resulting in keeping the speed of the shaft 7 constant when the transition from armature 6 to armature 5 or vice versa takes place.

Attention is also called to the fact that the high voltage part of the circuit is completely insulated from the low voltage part thereof due to the use of arms 24 and 28 which are insulated from each other by the pin 29.

Due to the fact that motors made in accordance with this invention may be instantaneously shifted from one source of current supply to another without decrease in speed or mechanical output, they have a wide application in power work where a constant drive is desired.

What is claimed is:

1. In a motor control system, a motor comprising two electrically independent armatures mechanically connected, electrically independent field windings cooperating with each of said armatures, and separate sources of direct current for supplying each of said armatures and associated field windings, and means controlled by one current source for making and breaking the circuit of the other current source, said means arranged whereby each of the field windings is energized in advance of the energization of the armature associated therewith.

2. In a motor control system, a motor comprising two electrically independent armatures mechanically connected, electrically independent field windings cooperating with each of said armatures, a separate source of direct current for supplying each of said armatures and associated field windings, electromagnetic means associated with each of said sources of current and adapted to cause the energization of the field winding associated therewith in advance of energizing the armature associated with the said field winding.

3. In a motor control system, a motor comprising two electrically independent armatures mechanically connected, electrically independent field windings cooperating with each of said armatures, a separate source of direct current for supplying each of said armatures and associated field windings, electromagnetic means associated with each of said sources of current and adapted to cause the energization of the field winding associated therewith in advance of energizing the armature associated with the said field winding, one of said electromagnetic devices controlled by the other.

4. In a motor control system, a motor comprising two electrically independent armatures mechanically connected, electrically independent field windings cooperating with each of said armatures, a separate source of direct current for supplying each of said armatures and associated field windings, electromagnetic means associated with each of said sources of current and adapted to cause the energization of the field winding associated therewith in advance of energizing the armature associated with the said field winding, one of said electromagnetic devices controlled by the current source connected thereto and arranged for controlling the operation of the other electromagnetic device.

5. In a motor control system, a motor having two current receiving devices, a separate source of current connected to each of said receiving devices and a relay for closing the circuit of one of said sources of current through one of said receiving devices upon failure of the other source of current, said relay having two windings, one of said windings in series with one of said current receiving devices and the other winding in series with the current source connected to said current receiving device.

6. In a motor control system, a motor having two current receiving devices, a separate source of current connected to each of said devices, means for automatically moving one of said current receiving devices to close a circuit therethrough and for interrupting the circuit of the other current receiving device upon failure of the current source connected thereto, said means comprising a relay having two windings, one in series with the last mentioned current receiving device and the other in series with the source of current connected thereto.

7. In a motor control system, a motor comprising two electrically independent armatures mechanically connected, electrically independent field windings cooperating with each of said armatures, a separate source of current for supplying each of said armatures and associated field windings and means controlled by one current source for making and breaking the circuit of said other source, said means comprising a relay having two windings, one of said windings in series with one of said field windings and the other winding of said relay in series with the armature associated with said field winding.

8. In a motor control system, a motor comprising two electrically independent direct current receiving devices mechanically connected, separate sources of current for supplying each of said current receiving devices, and means controlled by one current source for making and breaking circuits of the other current source, said means comprising a relay having two windings, one of which is conductively associated with one of said current receiving devices and the other conductively associated with the source of current provided for energizing said receiving device.

9. In a motor control system, a motor comprising two electrically independent armatures mechanically connected, electrically independent field windings cooperating with each of said armatures, and separate sources of direct current for supplying each of said armatures and associated field windings, one of said sources having a higher voltage characteristic than the other, means controlled by one current source for making and breaking the circuit of the other current source, said means arranged whereby each of the field windings is energized in advance of the energization of the armature associated therewith.

10. In a motor control system, a motor, a double wound relay, connections for said relay windings arranged so that said windings magnetically aid one another while said motor is in operation and so that said windings magnetically oppose one another during the interval required to stop the motor, and a second motor controlled at contacts of said relay.

11. In a motor control system, a motor, a field winding and an armature winding therefor, a double wound relay, one of said relay windings being in circuit with said field winding, and the other of said relay windings being in circuit with said armature winding, and a second motor controlled at contacts of said relay.

12. In a motor control system, a motor, a field winding and an armature winding therefor, a double wound relay, one of said relay windings being in circuit with said field winding, and the other of said relay windings being in circuit with said armature winding, connections for said relay windings arranged so that said relay windings magnetically aid one another while said motor is in operation and so that said relay windings magnetically oppose one another during the interval required to stop the motor, and a second motor controlled at contacts of said relay.

13. An electromotive device, two sources of current associated therewith, a relay controlling the association of said sources of current with said device, said relay having two windings, said windings being accumulatively energized when one of said sources is effective and differentially energized when said one source fails.

14. An electromotive device, two sources of current associated therewith, a relay controlling the association of said sources of current with said device, said relay having two windings, said windings being accumulatively energized when one of said sources is effective and differentially energized for a short period of time after said one source fails.

15. An electromotive device, a main source of current and an auxiliary source of current associated therewith, a relay controlling the association of said sources of current with said device, said relay having two windings accumulatively energized when said main source of current is effective and differentially energized when said main source fails.

In witness whereof, I hereunto subscribe my name this 29th day of June A. D., 1921.

PAUL A. NEWMAN.